March 10, 1964    N. H. POLAKOWSKI    3,124,020
METHODS OF AND APPARATUS FOR CONTROLLING ROLLING MILLS
Filed Oct. 26, 1960    2 Sheets-Sheet 1

Inventor
NATALIS H. POLAKOWSKI
by
Fidler Beardsley & Bradley Atty.

March 10, 1964   N. H. POLAKOWSKI   3,124,020
METHODS OF AND APPARATUS FOR CONTROLLING ROLLING MILLS
Filed Oct. 26, 1960   2 Sheets-Sheet 2
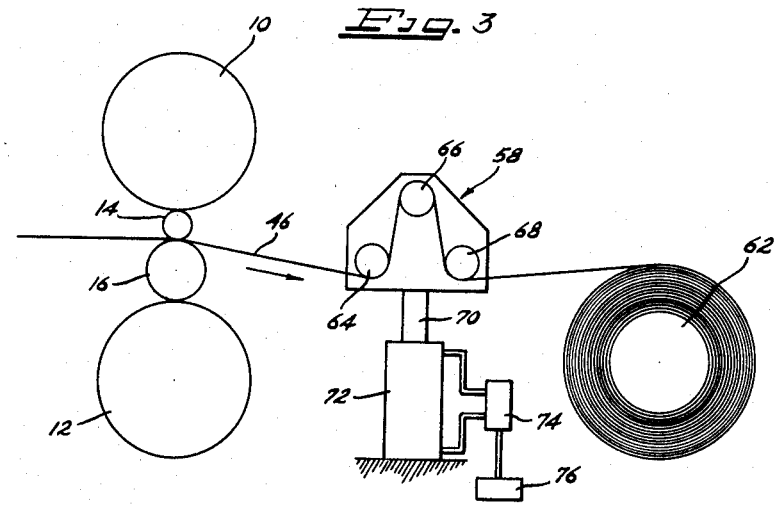
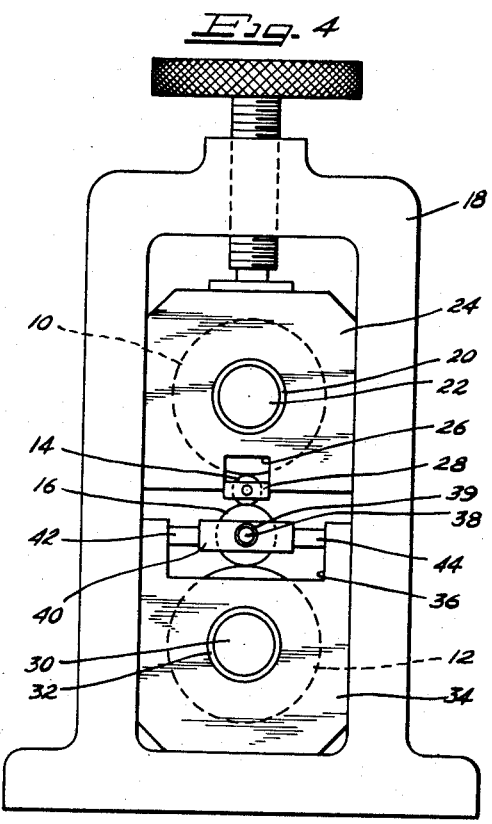
Inventor
NATALIS H. POLAKOWSKI
by Fidler, Beardsley & Bradley Attys.

United States Patent Office 3,124,020
Patented Mar. 10, 1964

3,124,020
METHODS OF AND APPARATUS FOR CONTROLLING ROLLING MILLS
Natalis H. Polakowski, 500 Kin Court, Wilmette, Ill.
Filed Oct. 26, 1960, Ser. No. 65,031
16 Claims. (Cl. 80—32)

This invention relates to methods of and apparatus for controlling operation of rolling mills for strip-metal material, and more particularly relates to methods of and apparatus for equalizing forces acting on a thin backed-up work roll of the mill in a direction normal to the plane containing the roll axes, to prevent deflection or breaking of such work roll.

It is well known in the art that to cold-roll sheet material to thin gauges, it is advantageous to use small diameter work rolls. Thus, metal strip which is thin and hard and usually of substantial width, such as various superalloys, austenitic, stainless steel below 0.010 inch thick and, say, 20 inches wide or more, or even carbon steel of comparable width, but 0.007 inch thick or thinner could formerly be rolled with relative ease only on mechanically complicated and costly cluster mills. Rolling these or similar materials on ordinary four high mills is difficult and often impossible, because the ratio of work-roll length to its diameter is limited to about 3:1 or 4:1, in view of the required torsional strength of the work-roll necks.

Even with backup-driven 4-high mills, where the problem of torsional strength of the work-roll necks is eliminated, the problem is not solved. Here, the unbalance which usually exists between the forward and backward tensions in the strip and the horizontal forces acting between the driving backing rolls and the friction-driven work rolls would produce a considerable resultant force acting in the rolling plane and normally directed toward the entry side of the material to the mill. This horizontal force not only bends the relatively slender and thin work rolls, but also puts a high pressure on the necessarily small bearings of these work rolls. To avoid roll breakage or bearing seizure under these conditions, the ratio of work-roll length to its diameter was limited to about 6:1 to 8:1.

In the past, suggestions have been made to attempt to solve this problem of reducing horizontal bending forces in the work rolls. For example, in Dahlstrom Patent 2,601,792, issued July 1, 1952, such apparatus is proposed. The Dahlstrom apparatus and other devices have proven inadequate, because they involve the use on the mill stand of various elements and accessories which are exposed to damage and make it difficult to thread the mill, to remove parts of the strip when the latter was torn in two, and complicated the maintenance problems. These and other devices required substantial changes in the mill-stand structure and thereby made the mill less convenient and accessible in use.

My present invention overcomes the disadvantages inherent in such prior devices.

In the past I have proposed apparatus for automatically balancing the horizontal forces acting upon the small diameter work roll by deriving a signal from pressure-sensing cells associated with the chocks in which the journals of the thin work-roll bearings are held. This unbalance signal or error signal is then through appropriate controls used to exert a corrective action upon the winding reel motor to thereby increase or decrease the amount of forward tension applied to the metal-strip material. This device is characterized by having the pressure-sensing cells associated with a small diameter work roll (or rolls).

Whereas the arrangement I have proposed is satisfactory for many purposes, it involves a substantial degree of inconvenience and difficulty when a thin, deflection-controlled work roll is to be changed, which occurs frequently due to wear. To change such work roll may require the removal and reinstallation of the pressure-sensing elements, which is inconvenient to the set-up man and exposes the pressure-sensing elements to physical damage. In addition, since various size or diameter thin work rolls will normally be required for a given mill, a number of special chocks will be required, each equipped with a bearing of proper size for use with the pressure-sensing cells.

I have now discovered that the unbalanced horizontal forces acting upon a thin work roll may be detected and controlled, completely independent of sensing devices on such thin work roll, thereby freeing the thin work roll of such sensing devices. The present disclosure results from this discovery.

Accordingly, an object of my invention is to provide a rolling mill comprising at least three rolls, having one thin and slender work roll, pressure-sensing devices associated with and actuated by means other than the thin work-roll body or mounts, and a control system for alleviating the unbalanced horizontal forces on said thin work roll.

A further object of my invention is to provide methods of equalizing horizontal, laterally deflecting forces on a thin work roll of a mill, and for controlling operation of the mill.

Another object of my invention is to provide a control system for a rolling mill for substantially eliminating or controlling unbalanced horizontal forces on the small work roll, and which system avoids the difficulties and problems inherent in prior-art control systems.

A still further object of my invention is to provide a control system for a rolling mill, having a small diameter work roll, wherein the unbalanced horizontal forces acting upon said work roll are sensed from other elements of the rolling mill, thus freeing said work roll of any sensing elements.

These and other objects and advantages will become more readily apparent as this description proceeds and is read in conjunction with the attached drawings, in which:

FIG. 3 is a schematic diagram of a 4-high rolling mill showing a tensionmeter and certain elements associated therewith for controlling the equilibrium of horizontal forces on the thinner of the two work rolls; and FIG. 4 is a side elevational view of a 4-high rolling mill showing how the rolls and associated sensing devices are mounted in the housing.

Figure 1:
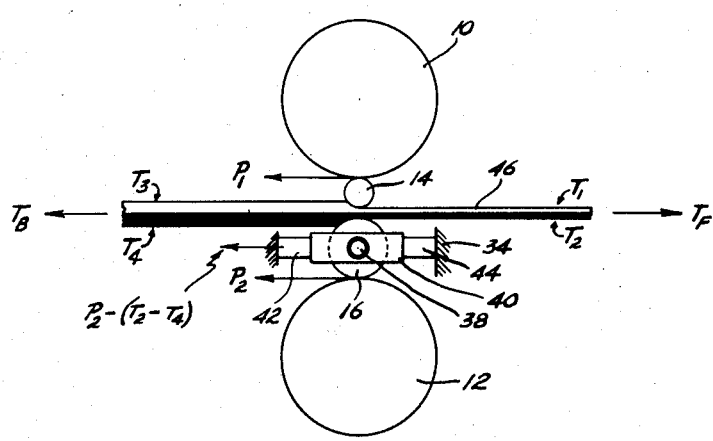
FIG. 1 is a schematic side elevational view of a 4-high rolling mill, incorporating certain characteristic features of my invention.

In FIG. 1, I have schematically shown a 4-high rolling mill which consists of an upper directly-driven backing roll 10 and a lower directly-driven backing roll 12. Driven from backing roll 10 through frictional engagement is a thin work roll 14 and directly driven from backing roll 12 is a larger work roll 16.

The manner in which the rolls are mounted in the rolling mill can best be seen by referring to FIG. 4 wherein a housing is indicated at 18. Direct-driven backing roll 10 has a bearing 20 carrying journal shaft 22 and mounted within upper roll chock 24. Chock 24 has a recessed portion 26 for receiving chock 28 of work roll 14. Lower directly-driven backing roll 12 has a similar journal 30 and bearing 32 carried within lower chock 34. The lower chock is also recessed at 36 to receive and support the lower work roll 16.

Lower work roll 16 has a journal shaft 38 rotatably mounted in bearing 39 within a chock 40. Either integral with chock 40 or separate therefrom are pressure-sensing cells 42 and 44, one disposed on each side of chock 40 in horizontal alignment with the axis of work roll 16. As seen in FIG. 4, pressure-sensing cells 42 and 44 and chock 40 all fit within recess 36 of chock 34. Thus, any force exerted on lower work roll 16 in a horizontal direction to the right will compress pressure-sensing cell 44, while any horizontal force exerted on lower work roll 16 to the left will cause a compressive force to be exerted on pressure sensor 42.

Referring again to FIG. 1, it will be seen that the metal strip is indicated at 46 and the direction of feed of the metal strip is from left to right. Strip 46 passes between thins work roll 14 and larger work roll 16 in the rolling direction, and its thickness, shown greatly exaggerated in FIG. 1, is reduced by the combined action of the rolling pressure, the front tension and back tension. The cross section of strip 46 is indicated in solid black in its lower portion and its upper portion is left blank. This is done to more easily discuss the tension distribution within the strip and the interaction between the strip and the two dissimilar work rolls engaging it. It does not necessarily imply that the strip is built up of two physically or dimensionally different layers. The various forces involved will now be identified.

A rearwardly directed, tangential force $P_1$ acts between rolls 10 and 14, whereas a similar, but not necessarily equal, force $P_2$ acts between rolls 12 and 16. A pull or front tension force $T_F$ is exerted on the strip in the rolling direction, and a back tension or force $T_B$ is exerted on the material in the direction opposite to the rolling direction. The front and back forces are applied by means of two coilers or reelers, of which the front coiler is usually driven by a suitable separate motor, whereas the rear coiler is held back by a breaking means, such as an electric generator or a mechanically or hydraulically adjustable brake.

A proportion $T_1$ of front tension $T_F$ acts in the right upper part of strip 46, thereby acting on roll 14 and thereby aiding in its rotation and tending to deflect it and to load its bearings in the rolling direction.

A proportion $T_3$ of back tension $T_B$ opposes rotation of roll 14 and tends to bend it in the direction opposite to the rolling direction and so to offset the load on its bearings due to $T_1$.

Force $P_1$, while being the principal agent in causing roll 14 to rotate, also tends to deflect it in the same direction as does $T_3$ and is, in this respect, additive to the latter.

In order to maintain the thin work roll 14 in an equilibrium condition corresponding to a zero load on its bearings, the following condition must be satisfied:

$$P_1 + T_3 = T_1 \quad (A)$$

Of these quantities, neither $T_1$ nor $T_3$ is directly measurable, and they represent unknown proportions of total tensions $T_F$ and $T_B$, which, of course, can be, and usually are, measured with the aid of tensiometers. $P_1$ is measurable through torque $M_1$ applied to roll 10 since $P_1 = M_1/R_1$ where $R_1$ is the radius of backing roll 10.

However, the unknown parameters $T_1$ and $T_3$ can be expressed in terms of other rolling data which can be measured as shown below:

Noting that $T_1 = T_F - T_2$ and $T_3 = T_B - T_4$ and substituting these into Equation A, one obtains:

$$P_1 + (T_B - T_4) = T_F - T_2$$

or $$P_1 + T_B = T_F - (T_2 - T_4)$$

or $$P_1 = (T_F - T_B) - (T_2 - T_4) \quad (B)$$

It is seen from FIG. 1 that the pressure cells 42 and 44 measure the difference $P_2 - (T_2 - T_4)$, and that force $P_2$ is also measurable in the way $P_1$ was, i.e., via torque $M_1$ applied to the driven backing roll 12, $P_2 = M_2/R_2$, $R_2$ being the diameter of roll 12. Equation B can now be rewritten in terms of variables, all of which are measurable. Hence, $$P_1 = (T_F - T_B) - P_2 + [P_2 - (T_2 - T_4)] \quad (C)$$

or $$(P_1 + P_2) = (T_F - T_B) + [P_2 - (T_2 - T_4)] \quad (D)$$

The above equation is appropriate for the most general case, i.e., when the drive is applied to both backing rolls 10 and 12 and both front and back tensions are used. However, in many cases the number of significant parameters is reduced. For instance, when the strip is fed into the mill from a decoil box, not back tension to speak of will exist and then $T_B = T_3 = T_4 = 0$ and Equation D is reduced to $$(P_1 + P_2) = T_F + (P_2 - T_2) \quad (E)$$

It is also possible to drive directly the thicker work roll because its neck may have adequate strength. In such case, $P_2 = 0$ and Equation D changes to $$P_1 = (T_F - T_B) - (T_2 - T_4) \quad (F)$$

In the absence of back tension, i.e., when $T_B = T_4 = 0$, all that remains is $$P_1 = T_F - (T_2) \quad (G)$$

Equation D and its variations appropriate for various mill-drive systems given above as (E), (F), and (G) will be called "the equilibrium equation" of the thinner work roll, and the equation must be satisfied to keep the thinner work roll in equilibrium with respect to the applied forces acting in the rolling plane, so that the bearing loads of said roll are zero or, for practical purposes, very low. This is accomplished when the sum of the forces on the left side of the equilibrium equations is equal to the sum of the quantities appearing at the right. Whenever the two differ, an error signal must be produced, this signal being used, after suitable amplification if necessary, to alter one of the significant variables so as to offset such error.

If a mill of the type described is employed in a single-stand installation, high back tension is undesirable in many cases, and the error signal just mentioned is preferably used to correct $T_F$, $P_1$, $P_2$, or the ratio $T_1/T_2$ (while maintaining $T_F = T_1 + T_2$ constant in the last case) in the manner to be described below.

The various parameters appearing in the equilibrium equation and required to effect the balancing of the external forces will be measured thus: Tensions $T_F$ and $T_B$, by means of tensiometers which are standard cold-strip-mill equipment, in most cases; forces $P_1$ and $P_2$ are determined with very good accuracy from torque-measuring devices usually, but not necessarily, mounted on the mill-drive shafts, such as are described by J. Rankine et al. in a paper entitled "Resistance Strain Gauges for the Measurement of Roll Force, Torque and Strip Tension," Journal of the Iron and Steel Institute, 1948 (December), pp. 381–7, especially FIGS. 5 and 6. The error introduced by roll-neck friction is normally a very small percentage of the opeating load, the backing rolls 10 and 12 being almost universally mounted on oil-film or roller bearings. In fact, in most applications it will be sufficient to determine the roll torques (and thus $P_1$ and $P_2$) simply from the armature currents of the mill motors with a suitable correction for the effect of field strength and the approximate electrical and mechanical losses.

An additional correction of the torque values will have to be made to eliminate the effects of inertia of the appropriate rotating elements on the rolling torque. This can be done with the aid of pilot generators driven from the main-drive motors and equipped with suitable differentiating devices, such as an accelerometer or a transformer where the voltage output from the secondary coil is proportional to the rate of change of the voltage applied to the primary winding, or one of the other methods which are commonly known to those familiar with the art.

The quantity $[P_2-(T_2-T_4)]$ in (D) or the appropriate bracketed expressions in the three simplified equilibrium equations are determined directly with the aid of the load cells 42 and 44.

Figure 2:
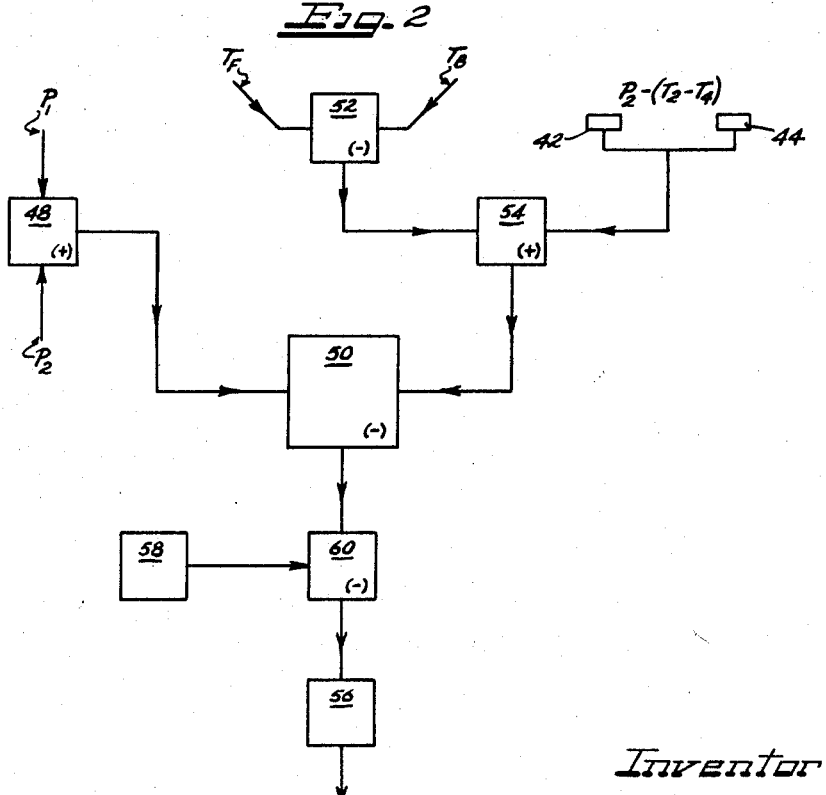
FIG. 2 is a schematic block diagram of the control circuit of my invention.

In FIG. 2, I have shown a block schematic diagram of the electrical control system that would be used in the most general case represented by Formula D. In the upper left-hand corner of FIG. 2, voltages proportional to forces $P_1$ and $P_2$ are totalized or added. Therefore, the output voltage of totalizer 48 represents the left-hand side of Equation D. In its simplest form, such totalizer will take the form of a circuit wherein the $P_1$ and $P_2$ D.C. voltage outputs are connected in series so as to be additive. The voltages representing forces $P_1$ and $P_2$ are produced either in torque meters or derived from the armature and excitation current values of the main-drive motors for rolls 10 and 12. The output of totalizer 48 is fed to discriminator 50. In its simplest form, discriminator 50 is identical to totalizer 48 except that the D.C. voltage outputs of totalizers 48 and 54 will be connected in opposition and their net difference appears on the output terminals of discriminator 50.

Voltages proportional to and representative of forces $T_F$ and $T_B$ are fed from the tensiometers into subtractor 52 where the voltage representative of force $T_B$ is subtracted from the voltage representative of force $T_F$, in accordance with the first part of the right-hand side of Equation D. As previously mentioned, the voltages representing forces $T_F$ and $T_B$ may be obtained by means of tensiometers which are standard cold-strip-mill equipment. The output of subtractor 52 is fed to totalizer 54.

Load cells or pressure sensors 42 and 44 are shown at the upper right-hand corner of FIG. 2, and, as previously explained, the output voltage of these load cells will be equal to $P_2-(T_2-T_4)$. It should be appreciated that in practice usually four load cells will be associated with large work roller 16, while only two such load cells are shown in FIG. 1 and in FIG. 2. The other pair of load cells will be located at the opposite end of large work roll 16, and the load cell that is to the left of work roll 16 and at the other end as viewed in FIG. 1 will be connected in series with load cell 42, while the other load cell that is at he right of work roll 16 and at the other end will be connected in series with load cell 44. The output of the load cells is also connected to totalizer 54. Thus, the output of totalizer 54 will represent the entire right-hand side of Equation D.

The output of totalizer 54 is fed into discriminator 50, so that discriminator 50 receives the output voltage from totalizer 54 and totalizer or adding device 48. The voltage from adding device 48 will be of opposite polarity to that of totalizer 54. When conditions are such that there are no unbalanced horizontal forces operating on small work roll 14, the two separate inputs to discriminator 50 will be balanced, and there will be a zero output signal from the discriminator 50. In this condition, the work roll is in equilibrium of forces, with its bearings being free from forces acting in a horizontal plane in, or opposite to, the rolling direction.

If conditions are such that there is an unbalance of forces on the small work roll, there will be an unbalance in the input signals to discriminator 50, and, therefore, an error signal proportional to the unbalance appears at its output. This error signal will not only be proportional to the unbalance of forces acting on the thin work roll 14, but will have a polarity depending on the direction of the resultant unbalanced forces. Discriminator 50 has its output connected usually to a D.C. amplifier 56, which amplifies the low-magnitude D.C. error voltage.

In some cases, it may be desirable to maintain a certain unbalance of forces on the small work roll, and for such cases I have shown a source of a reference voltage at 58. The reference voltage is adjusted to a value representing in polarity and magnitude the desired unbalance condition. This reference voltage may be subtracted from the output of discriminator 50 in discriminator 60 before the resultant voltage is supplied to D.C. amplifier 56. When the term "equalizing forces on the work roll" or similar expressions are used, it must be understood that this is not limited to a condition of zero balancing of forces, but equilibrium can mean different and various force conditions.

The error signal at the output of D.C. amplifier 56 may be used to alter or adjust several of the elements of the mill installation, all of which are capable of affecting one or more of the forces $P_1$, $P_2$, $T_F$, the ratio of $P_1:P_2$, and, in certain installations, $T_B$.

While I have shown the various electrical devices 48 through 60 as separate units, it, of course, will be appreciated by one skilled in the art that they are readily combined in numerous manners into a simplified network. In essence, the electrical devices shown simply add or subtract or amplify D.C. voltages, and an amplifier will perform the necessary function. For instance, one may use a so-called rotating amplifier consisting of an armature and as many independent field coils as are necessary to which the individual output voltages are applied to produce either a cumulative or subtractive field strength which proportionally develops an armature voltage of proper polarity.

As previously mentioned, when forces $P_1$ and $P_2$ are determined from the armature currents of the mill motors, an additional correction due to the effect of inertia of the various rotating elements of the rolling mill will usually be required during the acceleration and deceleration periods. If desired, this correction can be accomplished in several ways, such as the use of pilot generators driven from the main-drive motors and equipped with suitable differentiating devices, such as were earlier mentioned, or by other means well known in the art and commercially available. To simplifly the schematic diagram of FIG. 2 and since in some cases these corrections are not needed, the apparatus for producing the same are not shown.

Equation E represents the equilibrium condition when no back tension is used. While the same circuit diagram shown in FIG. 2 can be used for these conditions, it should be appreciated that the circuit is actually simplified under the conditions of Equation E. Thus, in these conditions $T_B$ is equal to zero, and, therefore, the forward tension force voltage $T_F$ may be fed directly into adding-circuit device 54.

Due to the arrangement that I have devised, work roll 16 may be a fairly thick roll and, therefore, would have sufficient size, so that it could be driven directly. When the thicker work roll 16 is directly driven, as previously pointed out, $P_2$ is equal to zero and Equation D simplifies to the form shown in Equation F. Thus, the electrical circuit for Equation F will be simpler than that shown in FIG. 2. In that case, the voltage representative of force $P_1$ may be fed directly into discriminator 50 and adding device 48 eliminated.

Equation G represents the conditions where thick work roll 16 is directly driven and there is no back tension. The electrical circuit for the conditions of Equation G is still further simplified, in that the voltage representative of force $P_1$ may be fed directly to discriminator 50 and the voltage representative of forward tension $T_F$ may be fed directly to subtracting device 54.

The error signal present at the output of the D.C. amplifier can be used in a variety of ways to correct the unbalance of forces and thereby bring small work roll 14 back into equilibrium. Usually the error signal will be fed to the control field on the generator supplying current to the front tension motor or winding motor, thereby increasing or decreasing its speed and thus altering the force $T_F$ (and $T_2$) until an equilibrium of forces is restored. Thus referring to Equation D, if the unbalance of forces is such that the forces $P_1$ plus $P_2$ representing the left-hand side of the equation are greater than the forces representing the right-hand side of the equation, the speed of the front tension motor will be increased, so that the force $T_F$ will be increased until such time as the forces reach a balance or equilibrium.

The error signal output of amplifier 56 may also be applied to control the speed of one of the motors providing the main-drive power to driven rolls 10 and 12, thereby changing forces $P_1$ and $P_2$. Also, the error-signal voltage output of D.C. amplifier 56 may be fed to the device controlling the output of the drag generator employed to produce back tension $T_B$. The particular selection of the method of control to be used for any given rolling mill setup will be apparent to those skilled in the art, and various methods or their combinations may be used, all utilizing the teachings of my invention.

In FIG. 3, I have shown another specific method of controlling the equilibrium of horizontal forces acting on small work roll 14. The regulating unit shown in this drawing consists of a tensiometer, generally indicated at 58, interposed on strip material 46 between the rolls and take-up reel 62. Tensiometer 58 consists of three rollers 64, 66, and 68, all of which are mounted on a hydraulic ram 70 which moves upwardly and downwardly within hydraulic cylinder 72. The flow of oil into cylinder 72 and, therefore, the movement of ram 70 are controlled by valve 74 which is continually adjusted by electric actuator 76. Such actuators are available commercially and consist basically of an electric motor with a direction of rotation dependent on the polarity on its terminals, which motor drives a rack or screw through suitable mechanical speed reducing gearing. Roller 66 is mounted on load cells (not shown) which permit measuring the tension within the strip to produce a voltage representing $T_F$.

The electrical output of D.C. amplifier 56 of FIG. 2 is connected to electric actuator 76, and operation of hydraulic valve 74 is continually controlled thereby. Upon actuation of the tensiometer, the entire strip of metal is moved upwardly or downwardly, depending on the polarity of the error signal, and thereby wrapped over a larger section of thin work roll 14 or thick work roll 16, respectively. This causes the division of tension components $T_1$ and $T_2$ (see FIG. 1) between rolls 14 and 16 to vary and thus effects the equilibrium of small work roll 14.

The device of FIG. 3 operates as follows: When small work roll 14 is deflected or pulled to the right by a preponderant forward tension force ($T_1$ component), an error signal is delivered to electric actuator 76 via D.C. amplifier 56. This actuates valve 74 and causes tensiometer 58 to be moved, thereby altering the angle between strip 46 and the normal, horizontal rolling plane. This actually causes the $T_1/T_2$ ratio to change and serves to restore equilibrium on small work roll 14. Thus, the error signal produced may be used in a variety of ways and with a variety of devices, all within the purview of my invention.

From the foregoing it will be evident that I have described novel methods of and apparatus for equalizing the forces on a thin work roll of a rolling mill. Various changes and modifications may be made in the apparatus and method of my invention without departing from the scope thereof as defined in the following claims.

I claim:

1. The method of equalizing horizontal forces on a thin work roll of a 4-high rolling mill for rolling strip material and having a first direct-driven backing roll in frictional contact with said thin work roll, a larger work roll and a second direct-driven backing roll in frictional contact with said larger work roll, by satisfying the equation, $$(P_1+P_2)=(T_F-T_B)+[P_2-(T_2-T_4)]$$

wherein $P_1$ is the tangential force acting between the thin work roll and first direct-driven roll, $P_2$ is the tangential force acting between the larger work roll and second direct-driven backing roll, $T_F$ is the front tension acting on the strip material in the rolling direction, $T_B$ is the back tension acting on the strip material, $T_2$ is the portion of $T_F$ that acts on the larger work roll, and $T_4$ is the portion of $T_B$ that acts on the larger work roll, comprising the steps of measuring the values of $P_1$, $P_2$, $T_F$, $T_B$, and $[P_2-(T_2-T_4)]$, producing a voltage proportional to the value of each, combining together the voltages representing $P_1$ and $P_2$ combining together the voltages representing $T_F-T_B$ and $[P_2-(T_2-T_4)]$, comparing the combined voltages to produce an error signal and applying the error signal to the mill to change the horizontal forces on the thin work roll to equilibrium.

2. The method of equalizing horizontal forces on a thin work roll of a 4-high rolling mill for rolling strip material and having a first direct-driven backing roll in frictional contact with said thin work roll, a larger work roll and a second direct-driven backing roll in frictional contact with said larger work roll, by satisfying the equation, $$(P_1+P_2)=T_F+[P_2-T_2]$$

wherein $P_1$ is the tangential force acting between the thin work roll and first direct-driven roll, $P_2$ is the tangential force acting between the larger work roll and second direct-driven backing roll, $T_F$ is the front tension acting on the strip material in the rolling direction, and $T_2$ is the portion of $T_F$ that acts on the larger work roll, comprising the steps of measuring the values of $P_1$, $P_2$, $T_F$, and $(P_2-T_2)$, producing a voltage proportional to the value of each, combining together the voltages representing $P_1$ and $P_2$, combining together the voltages representing $T_F$ and $(P_2-T_2)$, comparing the combined voltages to produce an error signal, and applying the error signal to the mill to change the horizontal forces on the thin work roll to equilibrium.

3. The method of equalizing horizontal forces on a thin work roll of a rolling mill for rolling strip material and having a direct-driven backing roll in frictional contact with said thin work roll and a larger, directly driven work roll by satisfying the equation, $$P_1=(T_F-T_B)-(T_2-T_4)$$

wherein $P_1$ is the tangential force between the thin work roll and direct-driven roll, $T_F$ is the front tension acting on the strip material in the rolling direction, $T_B$ is the back tension acting on the strip material, $T_2$ is the portion of $T_F$ that acts on the larger work roll, and $T_4$ is the portion of $T_B$ that acts on the larger work roll, comprising the steps of measuring the values of $P_1$, $T_F$, $T_B$, and $(T_2-T_4)$, producing a voltage proportional to the values of each, combining together the voltages representing $T_F$, $T_B$, and $(T_2-T_4)$, comparing the combined voltages with the voltage proportional to $P_1$ to produce an error signal, and applying the error signal to the mill to change the horizontal forces on the thin work roll to equilibrium.

4. The method of equalizing horizontal forces on a thin work roll of a rolling mill for rolling strip material and having a first direct-driven backing roll in frictional contact with said thin work roll and a larger, directly driven work roll, by satisfying the equation, $$P_1=T_F-T_2$$

wherein $P_1$ is the tangential force acting between the thin work roll and direct-driven backing roll, $T_F$ is the front tension acting on the strip material in the rolling direction and $T_2$ is the portion of $T_F$ that acts on the larger work roll, comprising the steps of measuring the values of $P_1$, $T_F$, and $T_2$, producing a voltage proportional to the values of each, combining together the voltages representing $T_F$ and $T_2$, comparing the combined voltages to the voltage representing $P_1$ to produce an error signal, and applying the error signal to the mill to change the horizontal forces on the thin work roll to equilibrium.

5. The method of equalizing horizontal forces on a thin work roll of a rolling mill stand for rolling strip comprising the steps of producing a voltage representative of the forces exerted on another roll of the mill stand, producing a voltage representative of the tension exerted on the strip, producing a voltage representative of the driving force applied to the rolls, combining said voltages to produce an error signal, and changing the horizontal forces applied to said thin work roll in accordance with the value of said error signal.

6. The method of claim 5 wherein the horizontal forces applied to the thin work roll are changed by controlling the tension exerted on the strip in accordance with the value of said error signal.

7. The method of claim 5 wherein the horizontal forces applied to the thin work roll are changed by controlling the driving force applied to the rolls in accordance with the value of said error signal.

8. The method of claim 5 wherein the horizontal forces applied to the thin work roll are changed by altering the area of wrapping contact of the strip with the rolls in accordance with the value of said error signal.

9. In a strip rolling mill comprising at least three rolls and having one thin work roll and a larger work roll, apparatus for automatically maintaining an equilibrium of forces applied to said thin work roll in a plane along the line of travel of the strip material comprising means to sense the tension forces in the strip being rolled, means to sense the propelling forces applied to the work rolls, means to sense the differential force acting upon the larger work roll along said plane, means to produce an error signal derived from combining the sensed forces, and means to alter the value of one of said forces in accordance with the error signal to restore an equilibrium of forces applied to the thin working roll.

10. The apparatus of claim 9 wherein the means to alter the value of one of said forces changes the tension forces in the strip to restore equilibrium.

11. The apparatus of claim 9 wherein the means to alter the value of one of said forces changes the propelling forces applied to said work rolls.

12. The apparatus of claim 9 wherein the means to alter the value of one of said forces changes the area of wrapping contact of the strip material with said work rolls.

13. In a rolling mill for rolling strip material having a thin work roll and a thicker work roll, having means to apply driving force to said work rolls with the thin work roll being driven indirectly by frictional contact with a powered backing roll, and having means to apply tension forces to the strip material, apparatus for establishing an equilibrium of forces on said thin work roll by satisfying the equation, $$(P_1+P_2)=(T_F-T_B)+[P_2-(T_2-T_4)]$$

wherein $P_1$ is the frictional driving force applied tangentially to the surface of said thin roll, $P_2$ is the driving force applied to said thicker work roll, $T_F$ is the tension force applied to the strip in the rolling direction, $T_B$ is the tension force applied to the strip opposite to the rolling direction, and $[P_2-(T_2-T_4)]$ is the force acting in the rolling direction on said thicker work roll, comprising first means to produce a voltage representative of $P_1+P_2$, second means to produce a voltage representative of $(T_F-T_B)$, third means to produce a voltage representative of $[P_2-(T_2-T_4)]$, electrical means to compare the voltage representative of the left- and right-hand sides of said equation and to produce an error signal, and means to change the horizontal forces applied to the rolling-mill apparatus in accordance with the value of said error signal.

14. In a rolling mill for rolling strip material having a thin work roll and a thicker work roll, having means to apply driving force to said work rolls and having means to apply forward tension forces to the strip material, apparatus for establishing an equilibrium of forces on said thin work roll by satisfying the equation, $$(P_1+P_2)=T_F+(P_2-T_2)$$

wherein $P_1$ is the driving force applied to said thin work roll, $P_2$ is the driving force applied to said thicker work roll, $T_F$ is the tension force applied to the strip in the rolling direction, $(P_2-T_2)$ is the force applied to said thicker work roll, comprising first means to produce a voltage representative of $(P_1+P_2)$, second means to produce a voltage representative of $T_F$, third means to produce a voltage representative of $(P_2-T_2)$, electrical means to compare voltages representative of the left- and right-hand sides of said equation and produce an error signal, and means to change the horizontal forces applied to the rolling-mill apparatus in accordance with the value of said error signal.

15. In a rolling mill for rolling strip material having a thin work roll and a thicker work roll, having means to apply driving force to said work rolls and having means to apply forward tension forces to the strip material, apparatus for establishing an equilibrium of forces on said thin work roll by satisfying the equation, $$P_1=(T_F-T_B)-(T_2-T_4)$$

wherein $P_1$ is the driving force applied to said thin work roll, $T_F$ is in the tension force applied to the strip in the rolling direction, $(T_2-T_4)$ is the force applied to said thicker work roll, comprising first means to produce a voltage representative of $P_1$, second means to produce a voltage representative of $T_F$, third means to produce a voltage representative of $(T_2-T_4)$, electrical means to compare voltages representative of the left- and right-hand sides of said equation and produce an error signal, and means to change the horizontal forces applied to the rolling-mill apparatus in accordance with the value of said error signal.

16. In apparatus for rolling strip material having a thin work roll and a thicker work roll, having means to apply driving force to said work rolls, and having means to apply tension forces to the strip material, apparatus for establishing an equilibrium of forces on said thin work roll by satisfying the equation, $$P_1=T_F-(T_2)$$

wherein $P_1$ is the driving force applied to said thin work roll, $T_F$ is the tension force applied to the strip in the rolling direction, $(T_2)$ is the force applied to said thicker work roll, comprising first means to produce a voltage representative of $P_1$, second means to produce a voltage representative of $T_F$, third means to produce a voltage representative of $(T_2)$, electrical means to compare the voltages representative of the left- and right-hand sides of said equation and to produce an error signal, and means to change the horizontal forces applied to the rolling-mill apparatus in accordance with the value of said error signal.

References Cited in the file of this patent

UNITED STATES PATENTS

| | | |
|---|---|---|
| 2,601,792 | Dahlstrom | July 1, 1952 |
| 2,651,954 | Dahlstrom | Sept. 15, 1953 |